US009129587B2

(12) United States Patent
Liu et al.

(10) Patent No.: US 9,129,587 B2

(45) Date of Patent: Sep. 8, 2015

(54) METHOD, DEVICE AND SYSTEM FOR ELIMINATING NOISES WITH MULTI-MICROPHONE ARRAY

(75) Inventors: Song Liu, Weifang (CN); Bo Li, Weifang (CN)

(73) Assignee: GOERTEK INC., Weifang (CN)

( * ) Notice: Subject to any disclaimer, the term of this patent is extended or adjusted under 35 U.S.C. 154(b) by 408 days.

(21) Appl. No.: 13/814,559

(22) PCT Filed: Apr. 10, 2012

(86) PCT No.: PCT/CN2012/073712

§ 371 (c)(1), (2), (4) Date: Feb. 6, 2013

(87) PCT Pub. No.: WO2013/033991

PCT Pub. Date: Mar. 14, 2013

(65) Prior Publication Data

US 2013/0142349 A1 Jun. 6, 2013

(30) Foreign Application Priority Data

Sep. 5, 2011 (CN) .......................... 2011 1 0259355

(51) Int. Cl.

| | |
|---|---|
| ***H04B 15/00*** | (2006.01) |
| ***G10K 11/00*** | (2006.01) |
| ***H04R 3/00*** | (2006.01) |
| ***G10L 21/0208*** | (2013.01) |
| *G10L 21/0216* | (2013.01) |

(52) U.S. Cl.

CPC .......... *G10K 11/002* (2013.01); *G10L 21/0208* (2013.01); *H04R 3/005* (2013.01); *G10L 2021/02166* (2013.01); *H04R 2201/403* (2013.01); *H04R 2201/405* (2013.01)

(58) Field of Classification Search

USPC .......... 381/1, 19, 26, 56, 71.1, 92, 94.1, 94.2, 381/94.3, 94.7, 97, 98, 111, 122, 300

See application file for complete search history.

(56) References Cited

U.S. PATENT DOCUMENTS

| | | | | |
|---|---|---|---|---|
| 8,787,114 | B1 * | 7/2014 | Plotke | 367/119 |
| 2005/0080616 | A1 * | 4/2005 | Leung et al. | 704/200.1 |
| 2012/0076316 | A1 * | 3/2012 | Zhu et al. | 381/71.11 |
| 2012/0093344 | A1 * | 4/2012 | Sun et al. | 381/122 |

* cited by examiner

*Primary Examiner* — Vivian Chin
*Assistant Examiner* — Friedrich W Fahnert
(74) *Attorney, Agent, or Firm* — Troutman Sanders LLP

(57) ABSTRACT

To solve the problems with the prior art that a multi-microphone array cannot inhibit broad-band noises well and cannot be used in the increasingly widespread broad-band communication, embodiments of the present invention disclose a method, a device and a system for eliminating noises with multi-microphone array. The method according to an embodiment of the present invention comprises according to the number of different spacings between each of pairs of microphones of the multi-microphone array, dividing a full frequency band into the same number of sub-bands; decomposing signals of each of the pairs of microphones with the different spacings into a corresponding one of the sub-bands, wherein the larger the spacing between each pair of microphones is, the lower the frequencies of the sub-band into which the signals of the pair of microphones are decomposed will be; adaptively reducing the noises in the decomposed signals of each of the pairs of microphones with the different spacings in the corresponding sub-band to obtain noise-reduced signals for each of the sub-bands; and synthesizing the noise-reduced signals of each of the sub-bands to obtain a signal in which the noises have been reduced with the multi-microphone array in the full frequency band. The embodiments of the present invention can be used in scenarios of hands-free video calls.

16 Claims, 5 Drawing Sheets

METHOD, DEVICE AND SYSTEM FOR ELIMINATING NOISES WITH MULTI-MICROPHONE ARRAY

TECHNICAL FIELD

The present invention relates to the field of speech enhancement technologies, and more particularly, to a method, a device and a system for eliminating noises by means of a multi-microphone array technology.

DESCRIPTION OF RELATED ART

Currently, the most common multi-microphone array technology is the fixed beamforming technology, which performs weighted summation on signals of a plurality of microphones and, according to directional characteristics of the sound, maintains sound signals of a specific direction and inhibits noise signals of other directions. However, this technology can achieve a significant noise reduction effect only on narrow-band noises, and different spacings between microphones correspond to different frequency bands within which noises can be effectively reduced. Specifically, small spacings can achieve a better narrow-band noise reduction effect at high frequencies than that at low frequencies, and large spacings can achieve a better narrow-band noise reduction effect at low frequencies than that at high frequencies. However, the communication bandwidth is relatively large in the current network communication, so it has become impossible for the technology, which has effects only on the narrow-band noises, to meet the needs.

In order to solve the problem of inhibiting broad-band noises, a constant beamwidth beamforming technology is further provided. According to this technology, a great number of microphones are used to constitute a microphone array having various spacings between the microphones, with each of the spacings between microphones having a good noise reduction effect on a certain narrow-band component; and a desired broad-band noise reduction effect can be obtained by synthesizing those noise reduction effects on the individual narrow-band components. However, this technology requires a great number of microphones, and the microphones must have large spacings therebetween in order to achieve a good noise reduction effect in the low-frequency band. This makes the entire microphone array have a large size. Therefore, this technology cannot meet the requirements for small cameras of the current networks and TVs.

BRIEF SUMMARY OF THE INVENTION

In view of the problems with the prior art that the multi-microphone array cannot inhibit broad-band noises well and cannot be used in the increasingly widespread broad-band communication, embodiments of the present invention provide a method, a device and a system for eliminating noises with multi-microphone array, which can effectively inhibit full frequency band noises in the broad-band communication.

To achieve the aforesaid objective, the embodiments of the present invention adopt the following technical solutions.

In one aspect, the present invention discloses a method for eliminating noises with multi-microphone array, the method comprising according to the number of different spacings between each of pairs of microphones of the multi-microphone array, dividing a full frequency band into the same number of sub-bands;

decomposing signals of each of the pairs of microphones with the different spacings into a corresponding one of the sub-bands, wherein the larger the spacing between each pair of microphones is, the lower the frequencies of the sub-band into which the signals of the pair of microphones are decomposed will be;

adaptively reducing the noises in the decomposed signals of each of the pairs of microphones with the different spacings in the corresponding sub-band to obtain noise-reduced signals for each of the sub-bands; and synthesizing the noise-reduced signals of each of the sub-bands to obtain a signal in which the noises have been reduced with the multi-microphone array in the full frequency band.

Preferably, the method according to the embodiment of the present invention may further comprise acquiring a control parameter of an adaptive filter according to the amount of target signal components within a protection angle, and inputting the control parameter into the adaptive filter that adaptively reduces the noises in the corresponding sub-band.

In another aspect, the present invention discloses a device for eliminating noises with multi-microphone array, the device comprising a sub-band decomposition unit, being configured to, according to the number of different spacings between each of pairs of microphones of the multi-microphone array, divide a full frequency band into the same number of sub-bands, and to decompose signals of each of the pairs of microphones with the different spacings into a corresponding one of the sub-bands, wherein the larger the spacing between each pair of microphones is, the lower the frequencies of the sub-band into which the signals of the pair of microphones are decomposed will be;

an adaptive filter, being configured to adaptively reduce the noises in the decomposed signals of each of the pairs of microphones with the different spacings in the corresponding sub-band to obtain noise-reduced signals for each of the sub-bands; and a sub-band synthesizing unit, being configured to synthesize the noise-reduced signals of each of the sub-bands to obtain a signal in which the noises have been reduced with the multi-microphone array in the full frequency band.

Preferably, the device according to the embodiment of the present invention may further comprise a noise-reduction control unit, being configured to acquire a control parameter of the adaptive filter according to the amount of target signal components within a protection angle, and input the control parameter to the adaptive filter that adaptively reduces the noises in the corresponding sub-band.

In another aspect, the present invention further discloses a system for eliminating noises with multi-microphone array, the system comprising a multi-microphone array, the multi-microphone array consisting of three or more microphones which have equal or different spacings therebetween; and the aforesaid device for eliminating noises with multi-microphone array, being configured to perform noise reduction processing on signals acquired by the multi-microphone array.

As can be known from this, the aforesaid technical solutions adopted by the embodiments of the present invention divide a full frequency band into the same number of sub-bands as the number of different spacings between microphones of the multi-microphone array, decompose signals of each of the pairs of microphones with the different spacings into a corresponding one of the sub-bands, then adaptively reduce the noises on the signals of each of the pairs of microphones with the different spacings in the corresponding sub-band to obtain noise-reduced signals for each of the sub-bands, and finally synthesize the noise-reduced signals of each of the sub-bands to obtain a full frequency band noise-reduced signal. This can effectively inhibit the full frequency band noises in broad-band communication, and solve the problems with the prior art that a multi-microphone array cannot inhibit broad-band noises well and cannot be used in the increasingly widespread broad-band communication. Thereby, the objective that the noises in the broad frequency band can be effectively inhibited by means of less microphones and a microphone array of a smaller size can be achieved.

Further, by acquiring a control parameter of an adaptive filter according to the amount of target signal components within a protection angle and inputting the control parameter into the adaptive filter, which adaptively reduces the noises in the corresponding sub-band, to control an updating speed of the adaptive filter, the present invention can not only effectively inhibit the noises in the broad frequency band but also meanwhile ensure a high speech quality to increase the signal-to-noise ratio of the full frequency band.

BRIEF DESCRIPTION OF THE SEVERAL VIEWS OF THE DRAWINGS

To describe the technical solutions of embodiments of the present invention or of the prior art more clearly, the attached drawings necessary for description of the embodiments or the prior art will be introduced briefly hereinbelow. Obviously, these attached drawings only illustrate some of the embodiments of the present invention, and those of ordinary skill in the art can further obtain other attached drawings according to these attached drawings without making inventive efforts.

DETAILED DESCRIPTION OF THE INVENTION

To make the objectives, technical solutions and advantages of the present invention clearer, the present invention will be described in detail hereinbelow with reference to the attached drawings and embodiments thereof. Obviously, the embodiments described herein are only some rather than all of the embodiments of the present invention. All the other embodiments obtained by those of ordinary skill in the art according to the embodiments of the present invention without making inventive efforts fall within the scope of the present invention.

Figure 1:
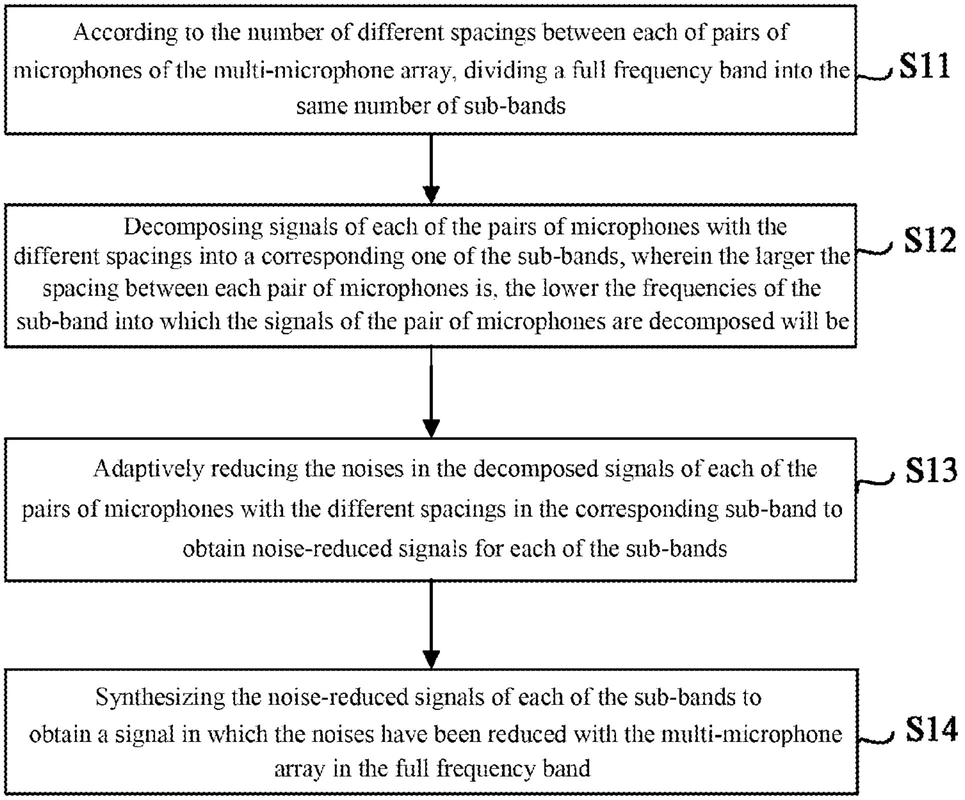
FIG. 1 is a flowchart diagram of a method for eliminating noises with multi-microphone array according to an embodiment of the present invention.

As shown in FIG. 1, a method for eliminating noises with multi-microphone array according to an embodiment of the present invention comprises the following steps.

S11: according to the number of different spacings between each of pairs of microphones of the multi-microphone array, dividing a full frequency band into the same number of sub-bands.

Figure 2:
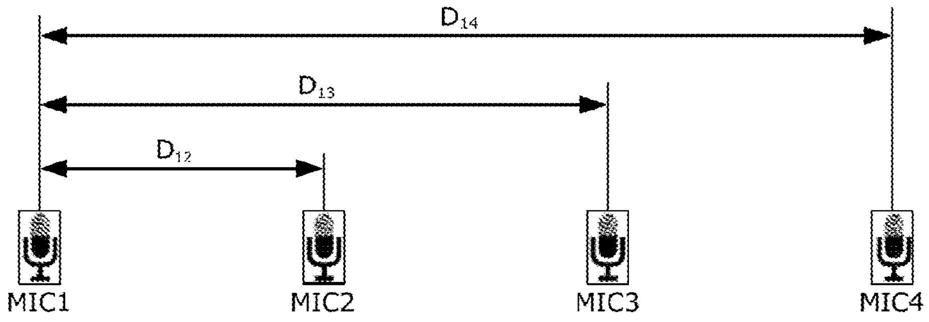
FIG. 2 is a schematic structural view of an equally spaced four-microphone array according to the embodiment of the present invention.
Figure 3:
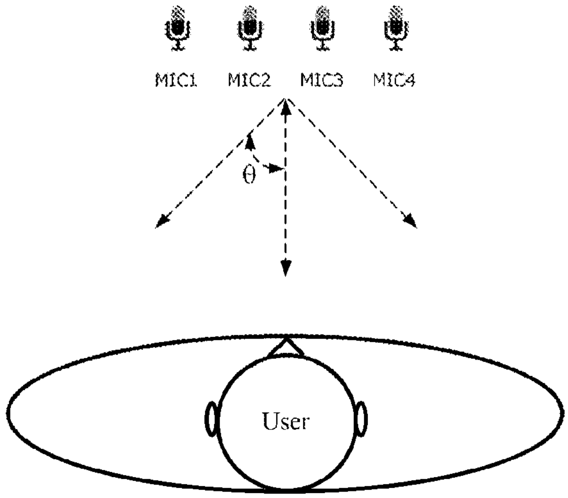
FIG. 3 is a schematic view illustrating an application scenario of the equally spaced four-microphone array according to the embodiment of the present invention.

Take an equally spaced four-microphone array as shown in FIG. 2 as an example. An application scenario of the equally spaced four-microphone array is shown in FIG. 3. Four microphones constitute one equally spaced microphone array to inhibit noise signals from a lateral direction and maintain a user speech from the front. There are three different spacings among the four microphones MIC1, MIC2, MIC3 and MIC4: a spacing $D_{14}$ between the microphone MIC1 and the microphone MIC4; a spacing $D_{13}$ between the microphone MIC1 and the microphone MIC3; and a spacing $D_{12}$ between the microphone MIC1 and the microphone MIC2. By means of the three different spacings between the microphones, the full frequency band can be divided into a low-frequency sub-band, an intermediate-frequency sub-band and a high-frequency sub-band corresponding to three sub-bands from low to high frequency.

Figure 4:
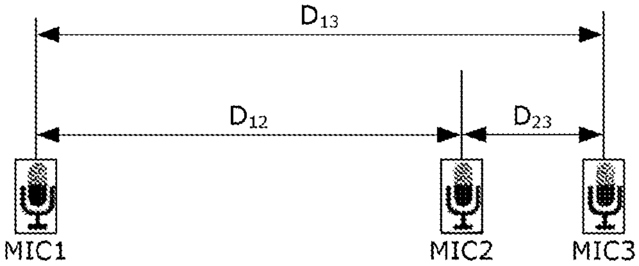
FIG. 4 is a schematic structural view of an unequally spaced three-microphone array according to the embodiment of the present invention.

Take an unequally spaced three-microphone array shown in FIG. 4 as an example. There are also three different spacings among the three microphones MIC1, MIC2 and MIC3: a spacing $D_{13}$ between the microphone MIC1 and the microphone MIC3; a spacing $D_{12}$ between the microphone MIC1 and the microphone MIC2; and a spacing $D_{23}$ between the microphone MIC2 and the microphone MIC3. By means of the three different spacings between the microphones, the full frequency band can be divided into a low-frequency sub-band, an intermediate-frequency sub-band and a high-frequency sub-band corresponding to three sub-bands from low to high frequency.

Figure 5:
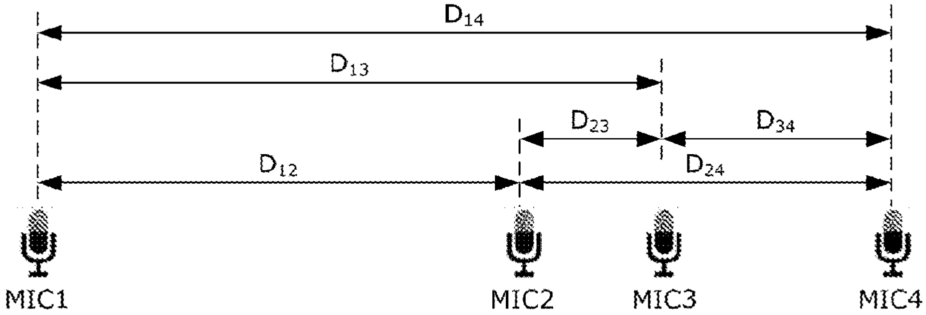
FIG. 5 is a schematic structural view of an unequally spaced four-microphone array according to the embodiment of the present invention.

Further, take an unequally spaced four-microphone array shown in FIG. 5 as an example. There are at most six different spacings among the four microphones MIC1, MIC2, MIC3 and MIC4: a spacing $D_{14}$ between the microphone MIC1 and the microphone MIC4; a spacing $D_{13}$ between the microphone MIC1 and the microphone MIC3; a spacing $D_{12}$ between the microphone MIC1 and the microphone MIC2; a spacing $D_{24}$ between the microphone MIC2 and the microphone MIC4; a spacing $D_{34}$ between the microphone MIC3 and the microphone MIC4; and a spacing $D_{23}$ between the microphone MIC2 and the microphone MIC3. By means of the six different spacings between the microphones, the full frequency band can be divided into a low-frequency sub-band, an intermediate-frequency sub-band 1, an intermediate-frequency sub-band 2, an intermediate-frequency sub-band 3, an intermediate-frequency sub-band 4 and a high-frequency sub-band corresponding to six sub-bands from low to high frequency.

S12: decomposing signals of each of the pairs of microphones with the different spacings into a corresponding one of the sub-bands, wherein the larger the spacing between each pair of microphones is, the lower the frequencies of the sub-band into which the signals of the pair of microphones are decomposed will be.

Only take the equally spaced four-microphone array shown in FIG. 2 as an example. Refer to the noise elimination principle shown in FIG. 6. The signals collected by the four microphones MIC1, MIC2, MIC3 and MIC4 are $s_1$, $s_2$, $s_3$ and $s_4$, respectively. The signals $s_1$ and $s_2$ of the microphones MIC1 and MIC2 with the minimum spacing therebetween are decomposed by a sub-band decomposition unit into the high-frequency sub-band to obtain high-frequency component signals $s_{11}$, $s_{21}$. The signals $s_1$ and $s_3$ of the microphones MIC1 and MIC3 with the intermediate spacing therebetween are decomposed by the sub-band decomposition unit into the intermediate-frequency sub-band to obtain intermediate-frequency component signals $s_{12}$, $s_{32}$. The signals $s_1$ and $s_4$ of the microphones MIC1 and MIC4 with the maximum spacing therebetween are decomposed by the sub-band decomposition unit into the low-frequency sub-band to obtain low-frequency component signals $s_{13}$, $s_{43}$.

In order to decompose signals of each of the pairs of microphones with the different spacings into a corresponding one of the sub-bands, a simple sub-band decomposition approach is to select a suitable low-pass filter, a suitable band-pass filter and a suitable high-pass filter, respectively, to filter the signals, respectively, to obtain respective low-frequency signals, intermediate-frequency signals and high-frequency signals; another sub-band decomposition approach which is more complex and accurate is to use an analysis filter set to decompose the signals into the low-frequency band, the intermediate-frequency band and the high-frequency band.

S13: adaptively reducing the noises in the decomposed signals of each of the pairs of microphones with the different spacings in the corresponding sub-band to obtain noise-reduced signals for each of the sub-bands.

Still take the equally spaced four-microphone array shown in FIG. 2 as an example. Refer to the noise elimination principle shown in FIG. 6. Firstly, the signal of any of the microphones is selected as a desired signal. For the equally spaced microphone array, the signal of the outermost microphone of the microphone array is preferably selected as the desired signal. For example, in this example, the signal $s_1$ of the microphone MIC1 is selected as the desired signal and the signals of the other microphones are used as reference signals. The signals $s_1$ and $s_2$ of the microphones MIC1 and MIC2 with the minimum spacing therebetween correspond to the decomposed signals $s_{11}$, $s_{21}$ in the high-frequency sub-band. These two signals $s_{11}$, $s_{21}$ are passed through an adaptive filter $H_1$ so that a high-frequency noise signal, from the lateral direction, in the signal $s_{11}$ is filtered out while the high-frequency user speech from the front is maintained so as to obtain an output signal $y_1$ of the high-frequency sub-band. The signals $s_1$ and $s_3$ of the microphones MIC1 and MIC3 with the intermediate spacing therebetween correspond to the decomposed signals $s_{12}$, $s_{32}$ in the intermediate-frequency sub-band. These two signals $s_{12}$, $s_{32}$ are passed through an adaptive filter $H_2$ so that an intermediate-frequency noise signal, from the lateral direction, in the signal $s_{12}$ is filtered out while the intermediate-frequency user speech from the front is maintained so as to obtain an output signal $y_2$ of the intermediate-frequency sub-band. The signals $s_1$ and $s_4$ of the microphones MIC1 and MIC4 with the maximum spacing therebetween correspond to the decomposed signals $s_{13}$, $s_{43}$ in the low-frequency sub-band. These two signals $s_{13}$, $s_{43}$ are passed through an adaptive filter $H_3$ so that a low-frequency noise signal, from the lateral direction, in the signal $s_{13}$ is filtered out while the low-frequency user speech from the front is maintained so as to obtain an output signal $y_3$ of the low-frequency sub-band.

Specifically, take the adaptive filter $H_1$ as an example. The signal $s_{21}$ as the reference signal is inputted into the adaptive filter $H_1$ to be filtered. The output signal of the adaptive filter $H_1$ is subtracted from the desired signal $s_{11}$ to obtain the signal $y_1$. Then, the signal $y_1$ is fed back to the adaptive filter to update a weight of the filter so that the output signal of the filter approximates $s_{11}$ and the signal $y_1$ has the minimum energy. When the noise signal is received by the microphone array, the adaptive filter is adaptively updated continuously to make the signal $y_1$ have the minimum energy (i.e., make the noises have the minimum energy), so as to achieve the noise reduction effect in the high-frequency band. Similarly, the adaptive filters $H_2$ and $H_3$ reduce noises in the intermediate-frequency band and the low-frequency band, respectively.

S14: synthesizing the noise-reduced signals of each of the sub-bands to obtain a signal in which the noises have been reduced with the multi-microphone array in the full frequency band.

The sub-band synthesis approach is selected depending on the sub-band decomposition approach adopted. Specifically, for the sub-band decomposition approach of selecting a suitable low-pass filter, a suitable band-pass filter and a suitable high-pass filter, respectively, to filter the signals, respectively, to obtain decomposed signals in the corresponding sub-bands, the full frequency band noise-reduced signal is obtained by using a sub-band synthesis approach of directly adding the noise-reduced signals of each of the sub-bands together; for the sub-band decomposition approach of using an analysis filter set to obtain decomposed signals in the corresponding sub-bands, the full frequency band noise-reduced signal is obtained by using a sub-band synthesis approach of using a corresponding synthesis filter set to synthesize the noise-reduced signals of each of the sub-bands.

Figure 6:
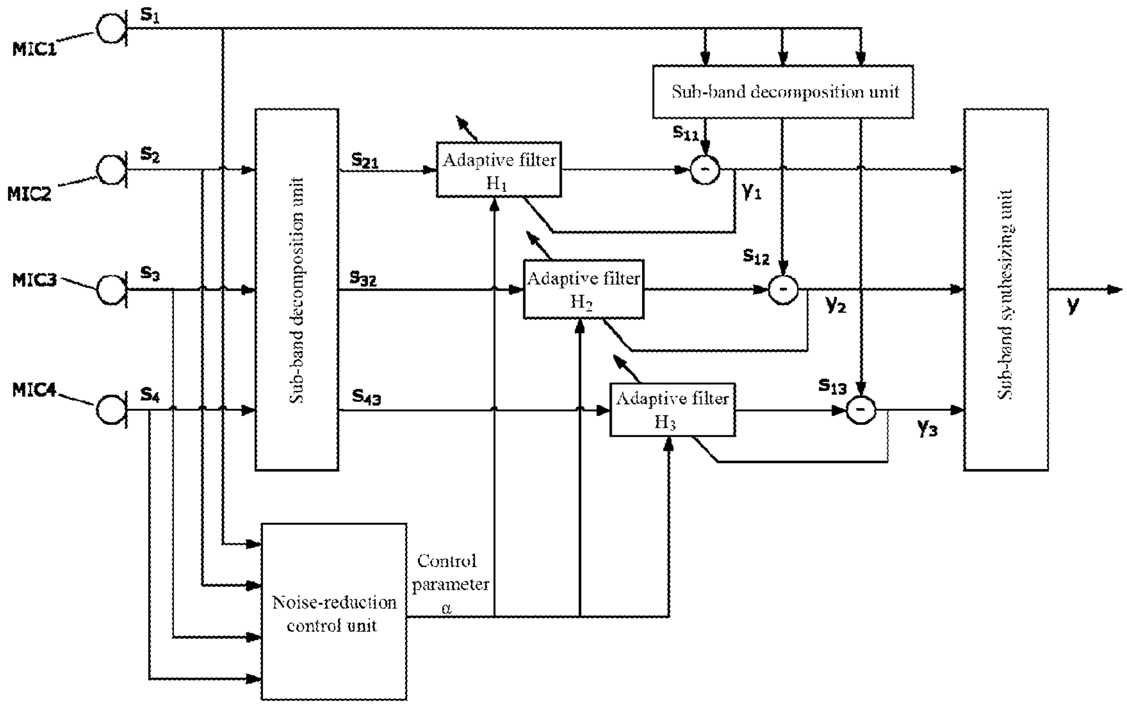
FIG. 6 is a schematic view illustrating the noise elimination principle of the equally spaced four-microphone array according to the embodiment of the present invention.

In the schematic view of the noise elimination principle of the equally spaced four-microphone array shown in FIG. 6, for example, a sub-band synthesizing unit may add the noise-reduced signals obtained in the three frequency bands together to obtain the full frequency band signal: $y=y_1+y_2+y_3$.

As can be known from this, the method for eliminating noises with multi-microphone array according to this embodiment of the present invention divides a full frequency band into the same number of sub-bands as the number of different spacings between microphones of the multi-microphone array, decomposes signals of each of the pairs of microphones with the different spacings into a corresponding one of the sub-bands, then adaptively reduces the noises in the signals of each of the pairs of microphones with the different spacings in the corresponding sub-band to obtain noise-reduced signals for each of the sub-bands, and finally synthesizes the noise-reduced signals of each of the sub-bands to obtain a full frequency band noise-reduced signal. This can effectively inhibit the full frequency band noises in the broad-band communication, and solve the problems with the prior art that the multi-microphone array cannot inhibit broad-band noises well and cannot be used in the increasingly widespread broad-band communication. Thereby, the objective that the noises in the broad frequency band can be effectively inhibited by means of less microphones and a microphone array of a smaller size can be achieved.

Preferably, the method for eliminating noises with multi-microphone array according to this embodiment of the present invention further comprises acquiring a control parameter of an adaptive filter according to the amount of target signal components within a protection angle, and inputting the control parameter into the adaptive filter that adaptively reduces the noises in the corresponding sub-band. The aforesaid target signal components mainly refer to the components, within the protection angle, of a signal incidence angle of each of the pairs of microphones.

In the process of the aforesaid step S13 of adaptively reducing the noises in the decomposed signals of each of the pairs of microphones with the different spacings in the corresponding sub-band, if the adaptive filter is still updated freely when a user speech is received by the microphone array, the adaptive filter will also eliminate the speech as the noises. Therefore, the updating of the adaptive filter must be controlled. When there exist only noises, the adaptive filter is allowed to be updated freely to effectively inhibit the noises; and when there exists a speech, the updating of the adaptive filter is stopped to protect the speech from being inhibited. The adaptive filter may be selected from a time-domain filter, a frequency-domain filter and a sub-band filter. For a frequency adaptive filter or a sub-band adaptive filter, it is necessary to transform signals of the full frequency band into a frequency domain or sub-bands, respectively, before performing adaptive filtering and then to transform the filtered signals back into time-domain signals.

Figure 7:
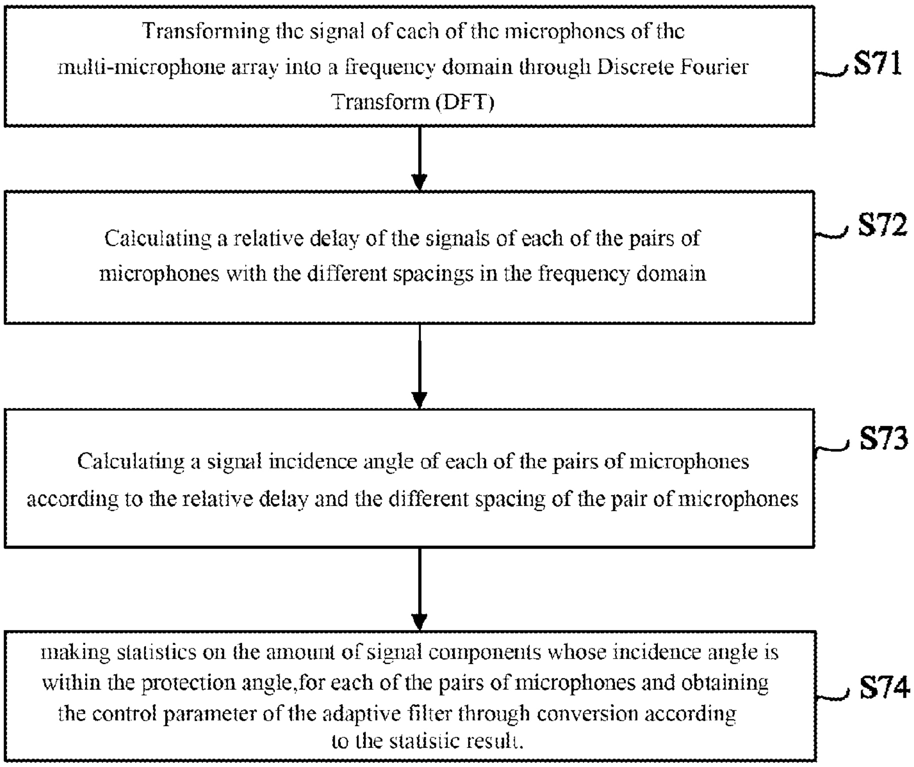
FIG. 7 is a flowchart diagram of an approach of acquiring a control parameter of an adaptive filter according to the amount of target signal components within a protection angle according to the embodiment of the present invention.

As shown in FIG. 7, the embodiment of the present invention provides an approach of acquiring a control parameter of an adaptive filter according to the amount of target signal components within a protection angle, the approach comprising S71: transforming the signal of each of the microphones of the multi-microphone array into a frequency domain through Discrete Fourier Transform (DFT);

S72: calculating a relative delay of the signals of each of the pairs of microphones with the different spacings in the frequency domain;

S73: calculating a signal incidence angle of each of the pairs of microphones according to the relative delay and the different spacing of the pair of microphones; and S74: making statistics on the amount of signal components whose incidence angle is within the protection angle, for each of the pairs of microphones and obtaining the control parameter of the adaptive filter through conversion according to the statistic result.

Take the equally spaced four-microphone array as an example. Firstly, the four microphone signals $s_1$, $s_2$, $s_3$ and $s_4$ are transformed into the frequency domain through Discrete Fourier Transform (DFT). Then, phase differences of signals of the three pairs of microphones (i.e., the microphones MIC1 and MIC2, the microphones MIC1 and MIC3, and the microphones MIC1 and MIC4) are calculated, and a relative delay of the signals of each of the pairs of microphones is calculated according to the phase differences. Next, a signal incidence angle of each of the pairs of microphones can be calculated according to the relative delay of the signals of the pair of microphones and the spacing between the pair of microphones, and three signal incidence angles are calculated for the three pairs of microphones. Finally, statistics is made on the amount of components, within the protection angle, of the three signal incidence angles so as to obtain the control parameter of the adaptive filter.

So the updating of the adaptive filter can be controlled by means of a signal incidence angle. If the signal incidence angle is within the protection angle, then it is regarded as a forward user speech and the adaptive filter shall stop updating; and if the signal incidence angle is outside the protection angle, then it is regarded as a lateral noise and the adaptive filter can be updated freely. The adaptive filters that adaptively reduce the noises in different sub-bands may have the same or different control parameters.

Figure 8:
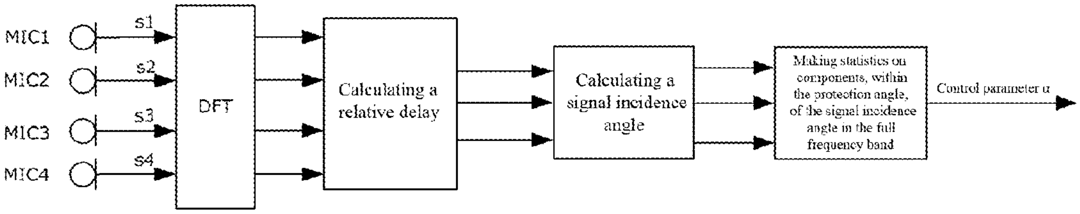
FIG. 8 is a schematic view illustrating the principle of an implementation of acquiring a control parameter of an adaptive filter by an equally spaced four-microphone array according to the embodiment of the present invention.

For example, referring to FIG. 8, statistics may be made on the amount of components, within the protection angle, of the signal incidence angle of each of the pairs of microphones in the full frequency band, and a unified control parameter $\alpha$ ($0 \le \alpha \le 1$) of the adaptive filter in the full frequency band can be obtained through conversion according to the statistic result. The more the target signal components within the protection angle are, the smaller the value of $\alpha$ will be and the lower an updating speed of the adaptive filter will be, and if all are the target signal components within the protection angle, then $\alpha=0$ and the adaptive filter will not be updated so as to protect the target speech signal; and conversely, the more the noise components outside the protection angle are, the larger the value of $\alpha$ will be and the higher the updating speed of the adaptive filter will be, and if all are the noise components outside the protection angle, then $\alpha=1$ and the adaptive filter will be updated at the maximum speed to inhibit the noise signal.

Figure 9:
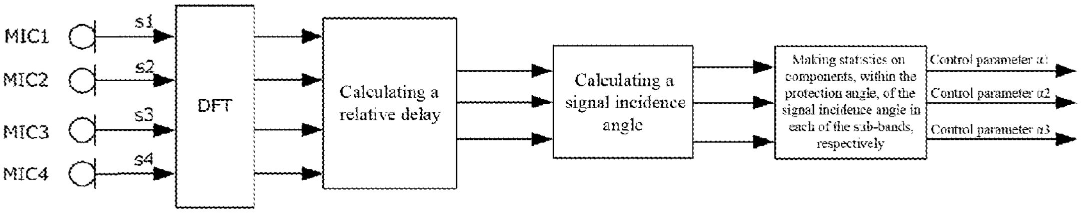
FIG. 9 is a schematic view illustrating the principle of another implementation of acquiring a control parameter of an adaptive filter by an equally spaced four-microphone array according to the embodiment of the present invention.

For example, referring to FIG. 9, statistics may also be made on the amount of components, within the protection angle, of the signal incidence angle of each of the pairs of microphones in each of the sub-bands, respectively, and a control parameter $\alpha_i$ ($0 \le \alpha_i \le 1$) of the adaptive filter of the $i^{th}$ sub-band can be obtained through conversion according to the statistic result. The more the target signal components outside the protection angle are, the larger the incidence angle will be, the larger the value of $\alpha_i$ will be and the higher the updating speed for the sub-band will be. If all the signal components of the $i^{th}$ sub-band are the target speech components within the protection angle, then $\alpha_i=0$ and the adaptive filter of the sub-band will not have the coefficient thereof updated so as to protect the target speech components of the sub-band; and if all the signal components of the $i^{th}$ sub-band are outside the protection angle, then $\alpha_i=1$ and the adaptive filter of the sub-band will have the coefficient thereof updated at the maximum speed so as to inhibit the noise components of the sub-band. The aforesaid target signal components mainly refer to the components, within the protection angle, of the signal incidence angle of each of the pairs of microphones.

By acquiring a control parameter of an adaptive filter according to the amount of target signal components within a protection angle and inputting the control parameter into the adaptive filter, which adaptively reduces the noises in the corresponding sub-band, to control an updating speed of the adaptive filter, the preferred embodiment of the present invention can not only effectively inhibit the noises in the broad frequency band but also meanwhile ensure a high speech quality to increase the signal-to-noise ratio of the full frequency band.

Figure 10:
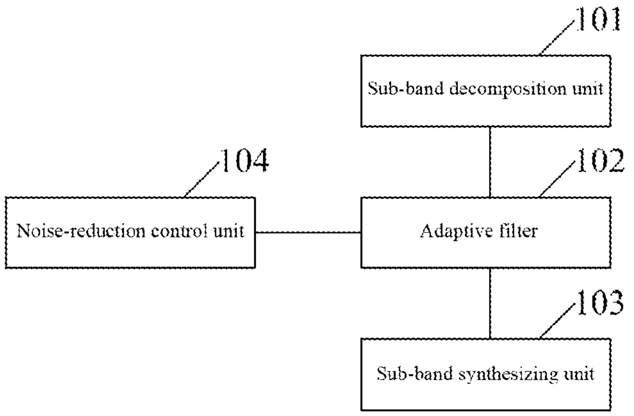
FIG. 10 is a schematic view illustrating functional units of a device for eliminating noises with multi-microphone array according to an embodiment of the present invention.

As shown in FIG. 10, a device for eliminating noises with multi-microphone array according to an embodiment of the present invention comprises a sub-band decomposition unit 101, being configured to, according to the number of different spacings between each of pairs of microphones of the multi-microphone array, divide a full frequency band into the same number of sub-bands, and to decompose signals of each of the pairs of microphones with the different spacings into a corresponding one of the sub-bands, wherein the larger the spacing between each pair of microphones is, the lower the frequencies of the sub-band into which the signals of the pair of microphones are decomposed will be;

an adaptive filter 102, being configured to adaptively reduce the noises in the decomposed signals of each of the pairs of microphones with the different spacings in the corresponding sub-band to obtain noise-reduced signals for each of the sub-bands; and a sub-band synthesizing unit 103, being configured to synthesize the noise-reduced signals of each of the sub-bands to obtain a signal in which the noises have been reduced with the multi-microphone array in the full frequency band.

Specifically, the sub-band decomposition unit 101 may select a suitable low-pass filter, a suitable band-pass filter and a suitable high-pass filter to filter the signals of each of the pairs of microphones with the different spacings, respectively, to obtain signals in the corresponding sub-band; or use an analysis filter set to decompose the signals of each of the pairs of microphones with the different spacings into the corresponding sub-band.

Correspondingly, when the sub-band decomposition unit 101 selects a suitable low-pass filter, a suitable band-pass filter and a suitable high-pass filter to filter the signals, respectively, to obtain decomposed signals in the corresponding sub-band, the sub-band synthesizing unit 103 obtains the full frequency band noise-reduced signal by using a sub-band synthesis approach of directly adding the noise-reduced signals of each of the sub-bands together. When the sub-band decomposition unit 101 uses an analysis filter set to obtain decomposed signals in the corresponding sub-band, the sub-band synthesizing unit 103 obtains the full frequency band noise-reduced signal by using a sub-band synthesis approach of using a corresponding synthesis filter set to synthesize the noise-reduced signals of each of the sub-bands.

Preferably, referring still to FIG. 10, the device for eliminating noises with multi-microphone array according to the embodiment of the present invention further comprises a noise-reduction control unit 104, being configured to acquire a control parameter of the adaptive filter according to the amount of target signal components within a protection angle, and input the control parameter into the adaptive filter 102 that adaptively reduces the noises in the corresponding sub-band. The aforesaid target signal components mainly refer to the components, within the protection angle, of the signal incidence angle of each of the pairs of microphones.

Figure 11:
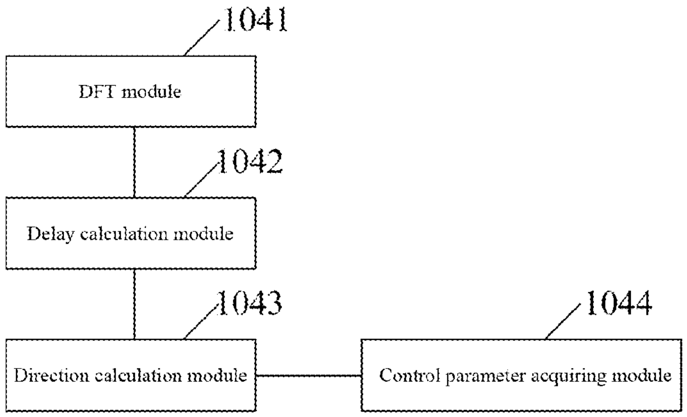
FIG. 11 is a schematic structural view of a noise-reduction control unit according to the embodiment of the present invention.

Further, referring to FIG. 11, there is shown a schematic structural view of the noise-reduction control unit according to the embodiment of the present invention. The noise-reduction control unit 104 may comprise a DFT module 1041, being configured to transform the signal of each of the microphones of the multi-microphone array into a frequency domain through Discrete Fourier Transform (DFT);

a delay calculation module 1042, being configured to calculate a relative delay of the signals of each of the pairs of microphones with the different spacings in the frequency domain;

a direction calculation module 1043, being configured to calculate a signal incidence angle of each of the pairs of microphones according to the relative delay and the corresponding one of the different spacings; and a control parameter acquiring module 1044, being configured to make statistics on the amount of signal components whose incidence angle is within the protection angle, for each of the pairs of microphones and obtain the control parameter of the adaptive filter through conversion according to the statistic result.

In an implementation, the control parameter acquiring module 1044 may be a full frequency band control parameter acquiring module, which is configured to make statistics on the amount of signal components whose incidence angle is within the protection angle, for each of the pairs of microphones in the full frequency band and obtain a unified control parameter $\alpha$ ($0 \le \alpha \le 1$) of the adaptive filter in the full frequency band through conversion according to the statistic result. The more the components within the protection angle are, the smaller the value of $\alpha$ will be and the lower an updating speed of the adaptive filter will be, and if all are the components within the protection angle, then $\alpha=0$ and the adaptive filter will not be updated; and conversely, the more the components outside the protection angle are, the larger the value of $\alpha$ will be and the higher the updating speed of the adaptive filter will be, and if all are the components outside the protection angle, then $\alpha=1$ and the adaptive filter will be updated at the maximum speed.

In another implementation, the control parameter acquiring module 1044 may be a sub-band control parameter acquiring module, which is configured to make statistics on the amount of signal components whose incidence angle is within the protection angle, for each of the pairs of microphones in each of the sub-bands, respectively, and obtain a control parameter $\alpha_i$ ($0 \le \alpha_i \le 1$) of the adaptive filter of the i" sub-band through conversion according to the statistic result. The more the components, within the protection angle, of the signal incidence angle are, the smaller the value of $\alpha_i$ will be and the lower an updating speed of the adaptive filter of the sub-band will be, and if all the signal incidence angle is of the components within the protection angle, then $\alpha_i=0$ and the adaptive filter of the sub-band will not be updated; and conversely, the more the components, outside the protection angle, of the signal incidence angle are, the larger the value of $\alpha_i$ will be and the higher the updating speed of the adaptive filter of the sub-band will be, and if all the signal incidence angle is of the components of outside the protection angle, then $\alpha_i=1$ and the adaptive filter of the sub-band will be updated at the maximum speed.

The detailed operations of each of the functional units or modules of the device according to the aforesaid embodiment of the present invention can be readily known with reference to the method according to the previous embodiment of the present invention. As can be understood that, the device for eliminating noises with multi-microphone array according to the embodiment of the present invention may be implemented by hardware logic or software; each of the functional units or modules of the device may be integrated together or be deployed separately; and a plurality of functional units or modules may be combined into a single unit or be further divided into a plurality of sub-units.

As can be known from this, the device for eliminating noises with multi-microphone array according to the embodiment of the present invention divides a full frequency band into the same number of sub-bands as the number of different spacings between microphones of the multi-microphone array, decomposes signals of each of the pairs of microphones with the different spacings into a corresponding one of the sub-bands through the sub-band decomposition unit 101, then adaptively reduces the noises in the signals of each of the pairs of microphones with the different spacings in the corresponding sub-band through the adaptive filter 102 to obtain noise-reduced signals for each of the sub-bands, and finally synthesizes the noise-reduced signals of each of the sub-bands through the sub-band synthesizing unit 103 to obtain a full frequency band noise-reduced signal. This can effectively inhibit the full frequency band noises in the broad-band communication, and solve the problems with the prior art that the multi-microphone array cannot inhibit broad-band noises well and cannot be used in the increasingly widespread broad-band communication. Thereby, the objective that the noises in the broad frequency band can be effectively inhibited by means of less microphones and a microphone array of a smaller size can be achieved.

Preferably, the noise-reduction control unit 104 acquires a control parameter of an adaptive filter according to the amount of target signal components within a protection angle and inputs the control parameter into the adaptive filter, which adaptively reduces the noises in the corresponding sub-band, to control an updating speed of the adaptive filter. This can not only effectively inhibit the noises in the broad frequency band but also meanwhile ensure a high speech quality to increase the signal-to-noise ratio of the full frequency band.

Figure 12:
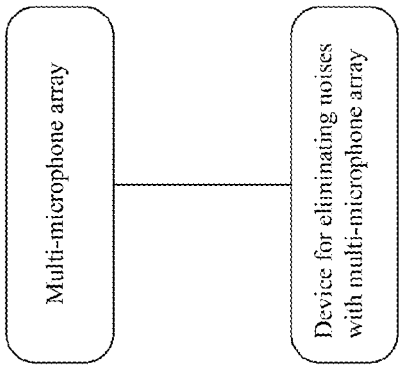
FIG. 12 is a schematic view illustrating constitution of a system for eliminating noises with multi-microphone array according to an embodiment of the present invention.

As shown in FIG. 12, an embodiment of the present invention further provides a system for eliminating noises with multi-microphone array, the system comprising a multi-microphone array, the multi-microphone array consisting of three or more microphones which have equal or different spacings therebetween; and the device for eliminating noises with multi-microphone array according to the aforesaid embodiment of the present invention, being configured to perform noise reduction processing on signals collected by the multi-microphone array.

As can be understood that, the technical solution according to the aforesaid embodiment of the present invention is suitable for use in an equally spaced or unequally spaced multi-microphone array consisting of three or more microphones, wherein the microphones are not limited in direction and may be unidirectional or omnidirectional. Moreover, the larger the number of different spacings between the microphones of the multi-microphone array is, the more and the narrower the sub-bands divided from the full frequency band will be, and the better the noise reduction effect achieved by the technical solution of the present invention will be.

Hereinbelow, the aforesaid technical solution of the present invention will be further described with reference to an embodiment.

Referring to FIG. 2, the four microphones MIC1, MIC2, MIC3 and MIC4 constitute one equally spaced microphone array, and the spacing between adjacent ones of the microphones is D=2 cm. The user speaks in a range between −45° and 45° (i.e., θ=45°) in the application scenario shown in FIG. 3. The signals $s_1$, $s_2$, $s_3$ and $s_4$ are received by the four microphones respectively at a sampling frequency of $f_s$=16 kHz. Referring to FIG. 6, the processing procedure of the present invention is as follows.

Step 1: firstly passing the four signals through the noise-reduction control unit to estimate the incidence angles of the signals in the frequency domain and accordingly calculate the control parameter α to control updating of the adaptive filter.

Specifically, transforming the signals $s_1$, $s_2$, $s_3$ and $s_4$ through Discrete Fourier Transform (DFT): firstly, enframing processing is performed on the signal $s_i$ (i=1~4), and each frame has N sampling points or has a frame length of 10 ms to 32 ms. Suppose that the $m^{th}$ frame signal is $d_i$ (m,n), where 0≤n<N and 0≤m. Two adjacent frames have M sampling points overlapped; that is, the first M sampling points of a current frame are the last M sampling points of a previous frame, and each frame has only new data of (L=N−M) sampling points. Therefore, the $m^{th}$ frame data is $d_i$(m,n)=$s_i$(m*L+n). In this embodiment, the frame length is N=512 (i.e., 32 ms), and the overlapping length is M=256 (i.e., 50% of the frame length). After the enframing processing, windowing is performed on each frame signal by means of the window function win(n), and the windowed data is $g_i$(m,n)=win(n)*$d_i$(m,n). The window function may be selected from the Hamming window, the Hanning window and the like. In this embodiment, the Hanning window is selected as the window function:

$$\text{win}(n) = 0.5\left(1 - \cos\left(\frac{2\pi n}{N-1}\right)\right).$$

Finally, the windowed data is transformed into the frequency domain through DFT:

$$G_i(m, k)e^{-j\phi_i(m,k)} = \frac{2}{N} * \sum_{n=0}^{N-1} g_i(m, n)e^{-j2\pi nk/N}, \text{ where } 0 \le k \le \frac{N}{2}$$

represents the frequency sub-band, $G_i$(m,k) represents the amplitude, and $\phi_i$(m,k) represents the phase.

Calculating a relative delay: the relative delay of the signals $s_i$ and $s_j$ is calculated as follows:

$$\Delta T_{ij}(m, k) = \frac{\phi_i(m, k) - \phi_j(m, k)}{2\pi f_s},$$

where ij=12, 13, 14.

Calculating a signal incidence angle: the signal incidence angle is calculated according to the relative delay of the signals $s_i$ and $s_j$ as follows:

$$\theta_{ij}(m,k)=\arcsin(\Delta T_{ij}(m,k)).$$

Acquiring a control parameter: statistics is made on components within the protection angle [−45°, 45°] according to the signal incidence angle $\theta_{ij}$ (ij=12, 13, 14) of each of the pairs of microphones in the full frequency band so as to obtain the control parameter α for the updating of the adaptive filter, where α is a number between 0 and 1, and is determined by the amount of frequency components within the protection angle. When the number of the frequency components within the protection angle is 0, α=1; and when the number of the frequency components outside the protection angle is 0, α=0.

Step 2: decomposing the signals $s_1$, $s_2$, $s_3$ and $s_4$ into high-frequency signals $s_{11}$ and $s_{21}$, intermediate-frequency signals $s_{12}$ and $s_{32}$, and low-frequency signals $s_{13}$ and $s_{43}$ through the sub-band decomposition unit.

Specifically, passing the signals $s_1$ and $s_2$ through a high-pass filter with a cut-off frequency of 3 kHz to obtain the high-frequency signals $s_{11}$ and $s_{21}$; passing the signals $s_1$ and $s_3$ through a band-pass filter with cut-off frequencies of 1 kHz and 3 kHz to obtain the intermediate-frequency signals $s_{12}$ and $s_{32}$; and passing the signals $s_1$ and $s_4$ through a low-pass filter with a cut-off frequency of 1 kHz to obtain the low-frequency signals $s_{13}$ and $s_{43}$.

Step 3: passing the high-frequency signals $s_{11}$ and $s_{21}$ through a time-domain adaptive filter $H_1$, the updating of which is controlled by the control parameter α, to obtain a noise-reduced high-frequency component $y_1$; passing the intermediate-frequency signals $s_{12}$ and $s_{32}$ through a time-domain adaptive filter $H_2$, the updating of which is controlled by the control parameter α, to obtain a noise-reduced intermediate-frequency component $y_2$; and passing the low-frequency signals $s_{13}$ and $s_{43}$ through a time-domain adaptive filter $H_3$, the updating of which is controlled by the control parameter $\alpha$, to obtain a noise-reduced low-frequency component $y_3$.

Specifically, the adaptive filter is an FIR filter with a step length P ($P \geq 1$), and the weight of the filter $H_j$ is $\overline{w_j}=[w_j(0), w_j(1), \ldots, w_j(P-1)]$. In this embodiment, P=64. The filtering result of the filter $H_j$ is $$y_j(n)=s_{1j}(n)-(w_j(0)*s_{(j+1)j}(n)+w_j(1)*s_{(j+1)j}(n-1)+\ldots+w_j(P-1)*s_{(j+1)j}(n-P+1)), \text{ where } j=1, 2, 3.$$

The signal $y_j(n)$ is fed back to the adaptive filter $H_j$ to update the weight $\overline{w_i}$ of the filter:

$$\overline{w_j}(n)=\overline{w_j}(n)+\mu*\gamma_j(n)*\overline{s_{(j+1)j}}(n),$$

where $\overline{s_{(j+1)j}}(n)=[s_{(j+1)j}(n), s_{(j+1)j}(n-1), \ldots, s_{(j+1)j}(n-P+1)]$.

The updating speed $\mu$ of the adaptive filter $H_j$ is controlled by the parameter $\alpha$. In this embodiment, $\mu=0.3*\alpha$. When $\alpha=1$ (i.e., all the components in the signals are noise components), $\mu=0.3$ and the adaptive filter converges rapidly until the signal $y_j(n)$ has the minimum energy so that the noises are eliminated. When $\alpha=0$ (i.e., all the components in the signals are target speech components), $\mu=0$ and the adaptive filter stops updating so that the speech components will not be offset and will be maintained in the output signal $y_j(n)$. When $0<\alpha<1$ (i.e., there are both speech components and noise components in the signals collected by the microphones), the updating speed of the adaptive filter is controlled by the amount of the speech components and the amount of the noise components to ensure that the noises are eliminated while the speech components are maintained.

Step 4: synthesizing the high-frequency signal $y_1$, the intermediate-frequency signal $y_2$ and the low-frequency signal $y_3$ by the sub-band synthesizing unit into a full frequency band noise-reduced signal y. In this embodiment, the noise-reduced signals obtained in the three frequency bands are added together to obtain the full frequency band signal: $y(n)=y_1(n)+y_2(n)+y_3(n)$.

It shall be appreciated that, the protection range of the protection angle selected in this embodiment is between −45° and 45°; however, in practice, the protection range may be adjusted according to the actual location and requirements of the user. The number of the microphones is not limited to four, either, but may be any other number equal to or larger than three; and the spacings between adjacent ones of the microphones are not necessarily identical. More microphones and more spacings of microphones can be used to decompose the signals into more and narrower sub-bands so that more accurate adaptive noise reduction processing can be performed to achieve a better noise reduction effect.

Furthermore, as can be understood that, the time-domain adaptive filter can be used to reduce the noises during the adaptive noise reduction processing in each of the sub-bands in the embodiments of the present invention; however, the application of the present invention is not limited to the time-domain adaptive filter, and the frequency-domain or sub-band adaptive filter may also be used to reduce the noises. Additionally, the present invention may use a low-pass filter, a band-pass filter and a high-pass filter for sub-band decomposition and add the sub-band components together for sub-band synthesis; however, the present invention may also use more accurate sub-band decomposition and synthesis approaches (e.g., in a manner of using an analysis filter set and a synthesis filter set to reduce signal distortion caused by sub-band decomposition and synthesis).

Finally, it shall be appreciated that, the method, the device and the system for eliminating noises with multi-microphone array according to the embodiments of the present invention can be used in scenarios of hands-free video calls. By eliminating noises, echoes and reverberations existing in the hands-free video calls to enhance the far-field speech, the present invention can increase the signal-to-noise ratio of the full frequency band to make the hands-free calls clearer and smoother.

What is described above is only embodiments of the present invention and is not intended to limit the scope of the present invention. Accordingly, any variants and modifications conceived, within the technical scope disclosed in the present invention, by those skilled in this art shall also fall within the protective scope of the present invention. And thus the protective scope of the present invention shall be determined according to the claims.

The invention claimed is:

1. A method for eliminating noises with multi-microphone array, the method comprising according to the number of different spacings between each of pairs of microphones of the multi-microphone array, dividing a full frequency band into the same number of sub-bands;

decomposing signals of each of the pairs of microphones with the different spacings into a corresponding one of the sub-bands, wherein the larger the spacing between each pair of microphones is, the lower the frequencies of the sub-band into which the signals of the pair of microphones are decomposed will be;

adaptively reducing the noises in the decomposed signals of each of the pairs of microphones with the different spacings in the corresponding sub-band to obtain noise-reduced signals for each of the sub-bands; and synthesizing the noise-reduced signals of each of the sub-bands to obtain a signal in which the noises have been reduced with the multi-microphone array in the full frequency band.

2. The method of claim 1, further comprising acquiring a control parameter of an adaptive filter according to the amount of target signal components within a protection angle, and inputting the control parameter into the adaptive filter that adaptively reduces the noises in the corresponding sub-band.

3. The method of claim 2, wherein the step of acquiring a control parameter of an adaptive filter according to the amount of target signal components within a protection angle comprises transforming the signals of each of the microphones of the multi-microphone array into a frequency domain through Discrete Fourier Transform (DFT);

calculating relative delay of the signals of each of the pairs of microphones with the different spacings in the frequency domain;

calculating signal incidence angle of each of the pairs of microphones according to the relative delay and the corresponding one of the different spacings; and making statistics on the amount of signal components, whose incidence angle is within the protection angle, for each of the pairs of microphones and obtaining the control parameter of the adaptive filter through conversion according to the statistic result.

4. The method of claim 3, wherein the step of making statistics on the amount of signal components whose incidence angle is within the protection angle, for each of the pairs of microphones and obtaining the control parameter of the adaptive filter through conversion according to the statistic result comprises making statistics on the amount of signal components whose incidence angle is within the protection angle, for each of the pairs of microphones in the full frequency band and obtaining a unified control parameter α of the adaptive filter in the full frequency band through conversion according to the statistic result, wherein 0≤α≤1, the more the components within the protection angle are, the smaller the value of α will be, and the lower an updating speed of the adaptive filter will be, and if all are the components within the protection angle, then α=0, and the adaptive filter will not be updated; and conversely, the more the components outside the protection angle are, the larger the value of α will be, and the higher the updating speed of the adaptive filter will be, and if all are the components outside the protection angle, then α=1, and the adaptive filter will be updated at the maximum speed.

5. The method of claim 3, wherein the step of making statistics on the amount of signal components whose incidence angle is within the protection angle, for each of the pairs of microphones and obtaining the control parameter of the adaptive filter through conversion according to the statistic result comprises making statistics on the amount of signal components whose incidence angle is within the protection angle, for each of the pairs of microphones in each of the sub-bands, respectively, and obtaining a control parameter $\alpha_i$ of the $i^{th}$ sub-band through conversion according to the statistic result, wherein $0 \le \alpha_i \le 1$, the more the components within the protection angle are, the smaller the value of $\alpha_i$ will be, and the lower an updating speed of the adaptive filter of the sub-band will be, and if all of the components within the protection angle, then $\alpha_i=0$, and the adaptive filter of the sub-band will not be updated; and conversely, the more the components outside the protection angle are, the larger the value of $\alpha_i$ will be, and the higher the updating speed of the adaptive filter of the sub-band will be, and if all of the components outside the protection angle, then $\alpha_i=1$, and the adaptive filter of the sub-band will be updated at the maximum speed.

6. The method of any of claim 1 to claim 5, wherein the step of decomposing signals of each of the pairs of microphones with the different spacings into a corresponding one of the sub-bands comprises selecting a low-pass filter, a band-pass filter and a high-pass filter to filter the signals of each of the pairs of microphones with the different spacings, respectively, to obtain decomposed signals in the corresponding sub-band; or using an analysis filter set to decompose the signals of each of the pairs of microphones with the different spacings into the corresponding sub-band.

7. The method of claim 6, wherein the step of synthesizing the noise-reduced signals of each of the sub-bands to obtain a signal in which the noises have been reduced with the multi-microphone array in the full frequency band comprises for the sub-band decomposition approach of selecting a low-pass filter, a band-pass filter and a high-pass filter to filter the signals, respectively, to obtain decomposed signals in the corresponding sub-band, obtaining the full frequency band noise-reduced signal by using a sub-band synthesis approach of directly adding the noise-reduced signals of each of the sub-bands together; or for the sub-band decomposition approach of using an analysis filter set to obtain decomposed signals in the corresponding sub-band, obtaining the full frequency band noise-reduced signal by using a sub-band synthesis approach of using a corresponding synthesis filter set to synthesize the noise-reduced signals of each of the sub-bands.

8. The method of any of claim 2 to claim 5, wherein the step of adaptively reducing the noises in the decomposed signals of each of the pairs of microphones with the different spacings in the corresponding sub-band comprises acquiring two signals of each of the pairs of microphones with the different spacings in the corresponding sub-band to obtain an desired signal and a reference signal of the sub-band, respectively;

inputting the reference signal into the adaptive filter to be filtered, subtracting the filtered signal from the desired signal to obtain an output signal, and feeding the output signal back to the adaptive filter to update a weight of the adaptive filter; and controlling the updating speed of the adaptive filter by means of the control parameter.

9. A device for eliminating noises with multi-microphone array, the device comprising a sub-band decomposition unit, being configured to, according to the number of different spacings between each of pairs of microphones of the multi-microphone array, divide a full frequency band into the same number of sub-bands, and to decompose signals of each of the pairs of microphones with the different spacings into a corresponding one of the sub-bands, wherein the larger the spacing between each pair of microphones is, the lower the frequencies of the sub-band into which the signals of the pair of microphones are decomposed will be;

an adaptive filter, being configured to adaptively reduce the noises in the decomposed signals of each of the pairs of microphones with the different spacings in the corresponding sub-band to obtain noise-reduced signals for each of the sub-bands; and a sub-band synthesizing unit, being configured to synthesize the noise-reduced signals of each of the sub-bands to obtain a signal in which the noises have been reduced with the multi-microphone array in the full frequency band.

10. The device of claim 9, further comprising:

a noise-reduction control unit, being configured to acquire a control parameter of the adaptive filter according to the amount of target signal components within a protection angle, and input the control parameter into the adaptive filter that adaptively reduces the noises in the corresponding sub-band.

11. The device of claim 10, wherein the noise-reduction control unit comprises a DFT module, being configured to transform the signal of each of the microphones of the multi-microphone array into a frequency domain through Discrete Fourier Transform (DFT);

a delay calculation module, being configured to calculate a relative delay of the signals of each of the pairs of microphones with the different spacings in the frequency domain;

a direction calculation module, being configured to calculate a signal incidence angle of each of the pairs of microphones according to the relative delay and the corresponding one of the different spacings; and a control parameter acquiring module, being configured to make statistics on the amount of signal components whose incidence angle is within the protection angle, for each of the pairs of microphones and obtain the control parameter of the adaptive filter through conversion according to the statistic result.

12. The device of claim 11, wherein the control parameter acquiring module is a full frequency band control parameter acquiring module, being configured to make statistics on the amount of signal components whose incidence angle is within the protection angle, for each of the pairs of microphones in the full frequency band and obtain a unified control parameter $\alpha$ of the adaptive filter in the full frequency band through conversion according to the statistic result, wherein $0 \le \alpha \le 1$, the more the components within the protection angle are, the smaller the value of $\alpha$ will be, and the lower an updating speed of the adaptive filter will be, and if all are the components within the protection angle, then $\alpha=0$, and the adaptive filter will not be updated; and conversely, the more the components outside the protection angle are, the larger the value of $\alpha$ will be, and the higher the updating speed of the adaptive filter will be, and if all are the components outside the protection angle, then $\alpha=1$, and the adaptive filter will be updated at the maximum speed.

13. The device of claim 11, wherein the control parameter acquiring module is a sub-band control parameter acquiring module, being configured to make statistics on the amount of signal components whose incidence angle is within the protection angle, for each of the pairs of microphones in each of the sub-bands, respectively, and obtain a control parameter $\alpha_i$ of the $i^{th}$ sub-band through conversion according to the statistic result, wherein $0 \le \alpha_i \le 1$, the more the components, within the protection angle, of the signal incidence angle are, the smaller the value of $\alpha_i$ will be, and the lower an updating speed of the adaptive filter of the sub-band will be, and if all the signal incidence angle is of components within the protection angle, then $\alpha_i=0$, and the adaptive filter of the sub-band will not be updated; and conversely, the more the components, outside the protection angle, of the signal incidence angle are, the larger the value of $\alpha_i$ will be, and the higher the updating speed of the adaptive filter of the sub-band will be, and if all the signal incidence angle is of the components outside the protection angle, then $\alpha_i=1$, and the adaptive filter of the sub-band will be updated at the maximum speed.

14. The device of claim 9, wherein the sub-band decomposition unit is configured to select a low-pass filter, a band-pass filter and a high-pass filter to filter the signals of each of the pairs of microphones with the different spacings, respectively, to obtain signals in the corresponding sub-band; or use an analysis filter set to decompose the signals of each of the pairs of microphones with the different spacings into the corresponding sub-band.

15. The device of claim 14, wherein the sub-band synthesizing unit is configured to, for the sub-band decomposition approach of the sub-band decomposition unit which selects a low-pass filter, a band-pass filter and a high-pass filter to filter the signals, respectively, to obtain decomposed signals in the corresponding sub-band, obtain the full frequency band noise-reduced signal by using a sub-band synthesis approach of directly adding the noise-reduced signals of each of the sub-bands together; and for the sub-band decomposition approach of the sub-band decomposition unit which uses an analysis filter set to obtain decomposed signals in the corresponding sub-band, obtain the full frequency band noise-reduced signal by using a sub-band synthesis approach of using a corresponding synthesis filter set to synthesize the noise-reduced signals of each of the sub-bands.

16. A system for eliminating noises with multi-microphone array, the system comprising a multi-microphone array, the multi-microphone array consisting of three or more microphones which have equal or different spacings therebetween; and the device for eliminating noises with multi-microphone array of any of claim 9 to claim 15, being configured to perform noise reduction processing on signals collected by the multi-microphone array.

* * * * *